Patented Jan. 20, 1942

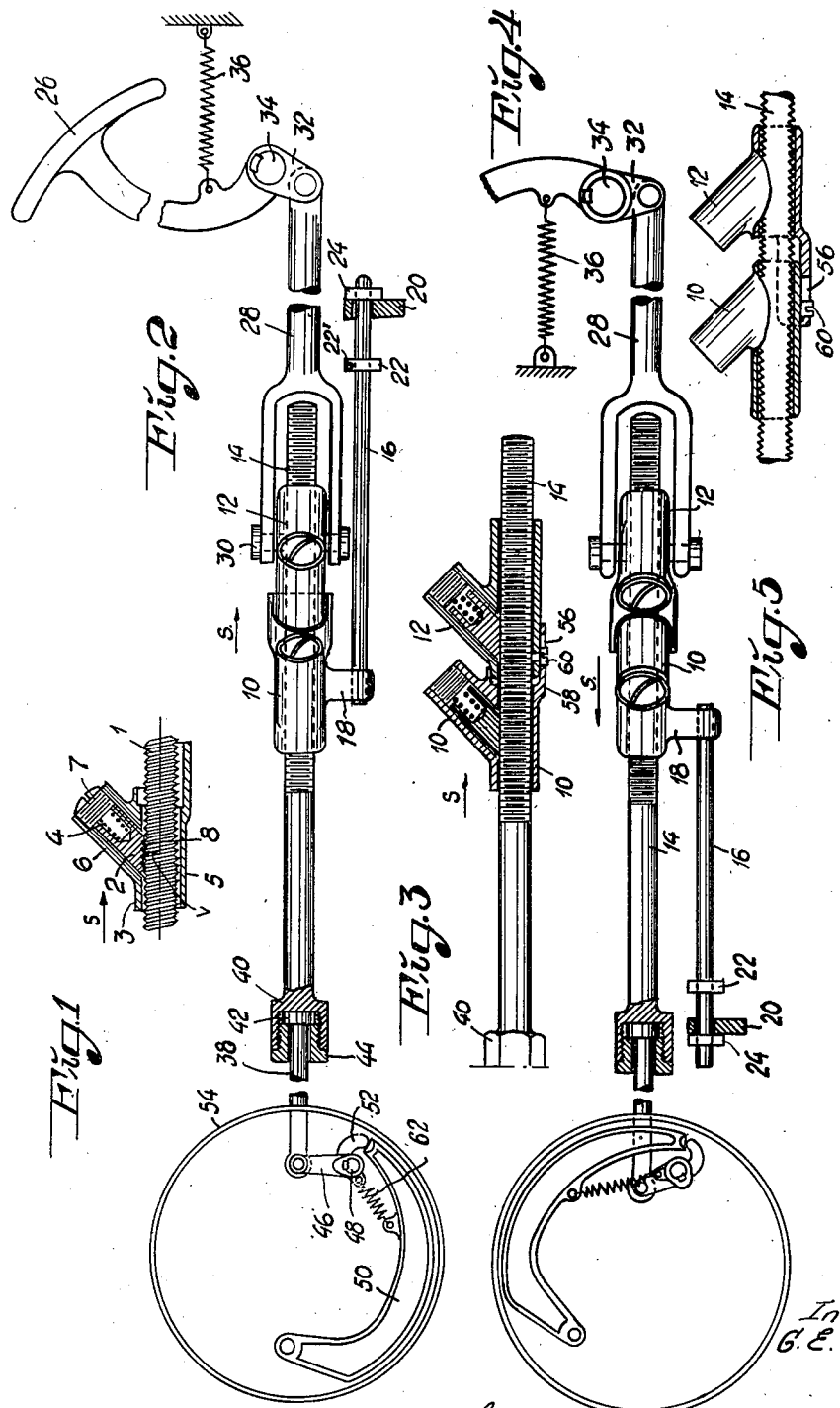

2,270,600

UNITED STATES PATENT OFFICE 2,270,600

ADJUSTING DEVICE, PARTICULARLY FOR BRAKES OF MOTOR VEHICLES

Georg Engelbrekt Ohlson, Stenberga, Klinten, Sweden

Application December 20, 1939, Serial No. 310,244
In Sweden January 2, 1939

4 Claims. (Cl. 188—196)

The present invention relates to slack adjusting devices particularly for brakes of motor vehicles and the like having a locking mechanism provided with a ratchet bar and a pawl cooperating therewith.

Primarily, the essential feature of the adjusting device relates to the fact that the ratchet bar has ratchet teeth in the form of one or more threads and is rotatable relatively to the pawl cooperating therewith and relatively to the device to be adjusted while maintaining the engagement between the pawl and the thread or threads. It is possible to use a screw having conventional triangular threads as the ratchet bar. However, the device is also connected with the advantage that any adjustment of the clearance can be effected manually by rotating the screw, and that restoration to the initial position of the adjusting device can be effected easily without breaking off the elements of the adjusting device, that is only by rotating the screw.

Further features of the invention and advantages thereof will be clear from the following detailed description of some embodiments of the invention illustrated by way of example in the accompanying drawing, wherein Fig. 1 is a longitudinal section of a locking mechanism associated with the device, Figs. 2-3 and 4-5, respectively, illustrate two different embodiments of the adjusting device suitable for brakes of motor vehicles, also the brake and brake pedal being indicated to facilitate the description, though the invention is not limited to this use.

Figs. 2 and 3 are part sectional views taken at right angles to each other and illustrating an adjusting device constructed to shorten the connection (lever system) between the operating member and the brake shoe, and Figs. 4 and 5 illustrate in a similar manner an adjusting device constructed for extension of said connection.

The stopping mechanism illustrated in Fig. 1 can be used to the most various objects, for example in combination with adjusting devices of the type described hereinafter, and consists of a ratchet bar constructed as a screw 1 and a pawl 2 which is arranged in a carrier 3 and is kept in resilient engagement with the screw by a spring 4. The carrier 3 is guided in the longitudinal direction of the screw 1 and to this effect it is formed with a tubular portion 5 surrounding the screw and having a smooth inner surface adapted to slide on the threads of the screw. Furthermore, the carrier has a guide forming an angle with the longitudinal axis of the screw and by which the pawl 2 is guided while being pressed against the screw 1. The guide has the form of a tubular projection 6 on the lateral wall of the carrier, and this projection contains the pawl 2 and the spring 4, the latter being clamped between the pawl and a screw 7 inserted into the projection. The pawl has formed thereon an engaging surface 8 formed with threads corresponding to those of the screw and adapted to cooperate therewith.

If the angle $v$ between the guiding direction of the pawl and the longitudinal direction of the screw 1 does not exceed a predetermined value, the carrier and the pawl are prevented from moving to the right (the stopping direction indicated by the arrow $s$) in Fig. 1 on the screw while, on the other hand, it is free to slide to the left on the screw. In the former case, the pawl 2 is clamped between the screw 1 and the upper wall of the guide 6 whereby the carrier 3 is locked on the screw (self-locking). On pressing the carrier in a direction opposite to the arrow, on the other hand, the pawl is pressed into the guide against the action of the spring 4 by the reaction pressure from the screw threads and, in consequence, the carrier can be displaced on the screw in this direction. Relative movement of the screw and the carrier is thus possible in one direction but prevented in the other direction.

In the embodiments of the invention illustrated in Figs. 2-3 and 4-5, respectively, two ratchet mechanisms of the construction hereinbefore described are used in each case. However, the screw is now common to both ratchet mechanisms, but it is clear that the same effect may be obtained by a separate screw for each ratchet mechanism if only the two ratchet mechanisms are coupled together in a suitable manner.

The unit consisting of pawl and carrier is designated by the term "pawl" hereinafter. The two pawls are denoted by 10 and 12 as a whole. The ratchet bar or screw common to the two pawls is designated by 14. The pawl 10 is connected with a device which limits the reciprocation thereof relatively to a fixed abutment within certain limits, the pawl 12 being actuated by an operating member. The necessary connecting members can have any suitable construction and are described hereinafter only to facilitate the comprehension of the invention.

According to the drawing, the device limiting the movement of the pawl 10 comprises a rod 16 one end of which is attached to a projection 18 on the carrier of the pawl 10, the other end passing freely through a hole in the fixed abutment 20. At each side of said abutment 20 the bar 16 carries a stopping ring 22 and 24, respectively. The stopping rings 22, 24 may be adjustable on the rod 16 to allow adjustment thereof to a suitable distance from each other. This distance is determined by the magnitude of the operating movement the device is to have during normal conditions. The stopping ring 22 may be connected to the rod 16, for instance by a suitable resilient coupling so as to yield and slide on the rod in case of too great forces. To this end, for example, the ring 22 may be constructed as a clamping ring which is clamped around the rod by a screw 22' by a force which, however, does not exceed a value permitting displacement of the ring if it should be forced against the abutment 20 by a too great power.

The connection between the pawl 12 and the operating member, the pedal 26, consists of a fork 28 which is pivoted to the carrier of the pawl 12 by means of pins 30 and, on the other hand, is connected with a lever 32 keyed to the brake pedal shaft 34. 36 designates the restoring spring of the brake pedal.

The screw 14 is rotatable in the pawls 10, 12 and in relation to the lever system in which the adjusting device is inserted. To this end, the screw is connected with a rod 38 in the brake lever system by a suitable coupling, indicated in the drawing as a sleeve 40 formed on one end of the screw 14, and a flange 42 mounted rotatably in said sleeve and formed on the end of the rod 38 to reach into the sleeve and be retained therein by a screw sleeve 44. The sleeve 40 at the end of the screw may be provided with a suitable wrench socket to facilitate the rotation of the screw.

The adjusting device may be connected to the brake by the rod 38 and possibly by other connecting members not illustrated in the drawing, for example with a lever 46 keyed as shown to a shaft 48 journalled in the brake housing and having a projection 52 actuating the brake shoe 50. The brake drum is indicated by 54.

The two pawls 10, 12 are connected with each other by a pin and slot connection formed by a slot 56 in a sleeve element 58 formed on one carrier and surrounding a part of the opposite end of the other pawl carrier, and a screw 60 fixed on the end of the latter and extending through the slot. By this connection the displacement of the pawls in relation to each other is limited.

The foregoing description applies to the two embodiments of the adjusting device. Some differences between these embodiments are to be observed. The adjusting device according to Figs. 2-3 is coupled so as to be subjected to pulling action from the brake pedal at the engagement of the brake, the device illustrated in Figs. 4-5 being subjected to pressure action. Furthermore, the pawls of the former embodiment are locking at a displacement to the right of the carriers relatively to the screw, whereas the locking direction is opposite in Figs. 4-5. The locking direction is indicated by the arrows s.

The operation of the embodiment shown in Figs. 2-3 is as follows: The various elements of the device are illustrated in the drawing in a position corresponding to disengaged brake, the stopping ring 24 engaging the fixed abutment 20 due to the action of the restoring spring of the brake, such as a spring 62. On an operating movement, that is, on forcing down the pedal 26, the fork 28 is pulled to the right in Fig. 2 and carries along the pawl 12. Since this pawl is locking in said direction also the screw 14 is carried along, and as a result the operating movement is transmitted to the brake, the shoe 50 of which will be engaged with the drum 54 in the usual manner. The pawl 10 and the rod 16 connected therewith also take part in the movement of the screw 14. The pawl 10 will be ineffective as long as the stroke of the brake is a normal one. At the engagement of the brake, the stopping ring 24 is moved from the abutment 20, and when the brake has been fully engaged the rod 16 has been displaced to such an extent that the abutment 22 is located in the close proximity of the abutment 20. When the brake shoe has been worn to a certain extent, that is, the clearance between the brake shoe and the brake drum has been too large, the stopping ring 22 will engage an abutment 20 at the end of the engaging movement due to the increased operating movement. As a consequence thereof, the pawl is prevented from taking part of the motion to the right of the screw 14 at the end of the engaging movement, that is a displacement of the pawl 10 to the right relatively to the screw 14 takes place. Such displacement of the pawl 10 is possible because it is opposite to the locking direction. The pawl 10 will, consequently, have another engaging position with its threads meshing with the threads of the screw and be set at a certain distance from the pawl 12. After the brake pedal has been released the entire lever system is returned to the left in Fig. 2 by the restoring spring 62 so as to disengage the brake. Initially, also the screw 14 is carried along during this movement. At the end of the movement, the stopping ring 24 will now (due to the displacement of the pawl 10 referred to above at the engagement) engage the abutment 20 and, thus, stop the pawl 10 and the screw 14 in a certain position. However, the spring 36 actuating the pedal now acts by means of the fork 28 on the pawl 12 and the pressure caused thereby is directed opposite to the stopping direction, that is to the left and, consequently, the pawl 12 will be displaced to the left until it is stopped by the pawl 10. Both pawls 10, 12 have, thus, been displaced to the left on the screw 14 to an extent corresponding to the wear occurring. At unchanged position of the pedal 26, this means that the brake lever system has been shortened and the brake shoe 50 has been carried nearer the brake drum 54 to an extent corresponding to the wear so that the clearance has been restored to its normal value. Suitably, the pawls are constructed so that the pin 60 and the slot 56 determine the mutual position of the pawls in the normal position of the brake, that is, so that when the pawl 12 is displaced towards the pawl 10 it is stopped at the end of the displacement by the fact that the pin 60 engages the left end of the slot 56.

As the brake is worn the pawls 10, 12 will move along the screw 14 to the left in the manner described. When the brake shoe has been completely worn and another brake lining is to be mounted, the adjusting device must be set to an initial position. This can be effected in a very simple manner at this device, that is by rotating the screw, for instance, by means of a wrench engaged at the sleeve 40 so as to screw the pawls back to the right on the screw. It is evident that at this device it is also very simple to set the brake clearance to a correct value initially.

The operation of the embodiment illustrated in Figs. 3–4 will be understood without a particular detailed description because it is analogous to that described with reference to the former embodiment. It is to be noted, however, that the spring 36 has a pulling action on the fork 28 and tends to pull the pawl 12 to the right at released brake and to separate the pawls 12, 10 instead of moving them together. By the pin and slot connection the movement of the pawls away from each other is limited. The adjustment occurring in case the clearance is too great operates in such a manner that the pawl 10 is moved towards the pawl 12 on the screw 14, that is to the right in Fig. 4 and the latter pawl then runs in succession to the right to the extent permitted by the pin and slot connection. When the brake is new the pawls 10, 12 are located to the left on the screw 14 and as the brake is worn they run more and more towards the right end thereof. Compensation for the wear of the brake is, thus, obtained in the present case by extension of the effective length of a rod in the brake lever system instead of by shortening as in the previous embodiment.

What I claim is:

1. A device for adjusting the clearance of brakes, comprising a ratchet bar, a continuous thread formed in the periphery thereof to constitute ratchet teeth, a carrier guided for displacement in the longitudinal direction of said ratchet bar, a pawl carried by said carrier, a guide provided on the carrier at an angle with the longitudinal axis of the ratchet bar, said guide being adapted to guide the pawl at an angle to the bar to cause self-locking between the pawl and the bar on displacement of the carrier in one direction relatively to the bar, and means permitting rotation of the ratchet bar and the carrier in relation to each other.

2. An adjusting device comprising a threaded ratchet bar, a pawl for engagement with the thread of said ratchet bar, guide means to guide said pawl in a direction forming such an angle with the longitudinal direction of the ratchet bar that the pawl is prevented from being displaced in one direction relatively to the ratchet bar due to wedge self-locking between the pawl and the thread of the ratchet bar but is permitted to move in the opposite direction.

3. An adjusting device for brakes comprising a threaded ratchet bar, a carrier displaceable in the longitudinal direction thereof, a pawl guided by said carrier, said pawl comprising a threaded surface, means to engage said surface with the threads of the ratchet bar, guide means on said carrier for guiding the pawl in a direction forming such an angle with the longitudinal direction of the ratchet bar as to cause self-locking between the pawl and the thread of the ratchet bar to prevent displacement of the pawl and the ratchet bar relatively to each other in one direction but to allow such displacement in the opposite direction, and means permitting rotation of the ratchet bar and the pawl relatively to each other while maintaining the engagement between the thread of the ratchet bar and that of the pawl.

4. An adjusting device for brakes to be associated with the brake lever system between an operating member and the brake shoe, comprising a ratchet bar provided with a peripheral thread to form ratchet teeth, two carriers slidable on said ratchet bar, a pawl displaceable in each of said carriers in a direction forming such an angle with the longitudinal axis of said ratchet bar as to prevent displacement of the pawl in one direction due to wedge self-locking effect between the pawl and the ratchet bar, means to connect the ratchet bar with the brake shoe, means to connect one of said carriers with the operating member and means connected with the other carrier to cooperate with a fixed abutment to cause slack adjusting movements of said ratchet bar and pawls involving change of the effective length of the brake lever system.

GEORG ENGELBREKT OHLSON.